United States Patent
Krapf (10) Patent No.: US 6,483,986 B1
(45) Date of Patent: Nov. 19, 2002

(54) METHOD AND APPARATUS FOR RECORDING STREAMING VIDEO DATA UPON SELECTION OF ALTERNATIVE SUBJECT MATTER

(75) Inventor: Russell M. Krapf, Dana Point, CA (US)

(73) Assignee: Keen Personal Media, Inc., Irvine, CA (US)

( * ) Notice: Subject to any disclaimer, the term of this patent is extended or adjusted under 35 U.S.C. 154(b) by 0 days.

(21) Appl. No.: 09/579,987

(22) Filed: May 26, 2000

(51) Int. Cl.[7] .................................................. H04N 5/91
(52) U.S. Cl. ............................ 386/68; 386/95; 386/125; 725/133; 725/153
(58) Field of Search ........................... 386/46, 125, 83, 386/112, 68, 95; 725/21, 59, 39, 88, 89, 40, 101, 102, 132, 140, 152, 135, 141, 153; 348/906; H04N 5/91

(56) References Cited

U.S. PATENT DOCUMENTS

| | | | | |
|---|---|---|---|---|
| 5,371,551 A | * | 12/1994 | Logan et al. ................ | 386/112 |
| 5,640,484 A | * | 6/1997 | Mankovitz ................... | 386/83 |
| 5,745,642 A | | 4/1998 | Ahn ............................. | 386/95 |
| 5,850,218 A | * | 12/1998 | LaJoie et al. ................. | 725/45 |
| 5,982,363 A | * | 11/1999 | Naiff .......................... | 725/133 |
| 6,018,612 A | | 1/2000 | Thomason et al. | |
| 6,260,192 B1 | * | 7/2001 | Rosin et al. .................. | 725/39 |

FOREIGN PATENT DOCUMENTS

| | | | | |
|---|---|---|---|---|
| EP | 0866446 A2 | | 9/1998 | |
| WO | WO 92/22983 | * | 12/1992 | ......... H04N/5/781 |
| WO | WO 96/33579 | | 10/1996 | |
| WO | WO 98/48566 | * | 10/1998 | ......... H04N/7/173 |

* cited by examiner

Primary Examiner—Vincent Boccio
(74) Attorney, Agent, or Firm—Milad G. Shara, Esq.; Knobbe, Martens, Olson & Bear, LLP (57) ABSTRACT

The present invention may be regarded as a method of permitting a viewer to view alternative subject matter data (e.g., an advertisement) on a display while receiving streaming video data without loss of the streaming video data. The method receives streaming video data and displays the streaming video data as a program of a first content. Upon selection by a viewer of the alternative subject matter data, the method stores the streaming video data on a personal video recorder. When the viewer selects returning to viewing of the streaming video data on the display, the method displays the streaming video data stored on the personal video recorder on the display while continuing to store incoming streaming video data on the personal video recorder. This method allows a viewer with "one click" to select and view the alternative subject matter data and with "one click" to return to the first content where it was left.

25 Claims, 4 Drawing Sheets

METHOD AND APPARATUS FOR RECORDING STREAMING VIDEO DATA UPON SELECTION OF ALTERNATIVE SUBJECT MATTER

BACKGROUND OF THE INVENTION

1. Field of the Invention

The invention relates to a method of displaying streaming video data. More particularly, the invention relates to a method of displaying streaming video data on a display and to a personal video recorder operating in accordance to the method.

2. Description of the Related Art

A digital video recorder (DVR), like a conventional analog video cassette recorder (VCR), is coupled to a monitor or a television set in a viewer's home and receives program broadcast signals via a coaxial cable, a satellite dish, or an antenna for terrestrial radio frequency (RF) signals. In some instances, the DVR may include a modem that permits access to content from the Internet. In order to record a particular program, the video recorder starts and stops recording the program at a predetermined day and time.

A DVR, as opposed to a VCR, allows a viewer to overcome the rigid time scheme according to which the programs are broadcast. That is, a viewer can decide whether to watch "live TV" or to record a program and watch it later at a more convenient day and time. Alternative systems provide for even more flexibility and viewer-specific television. For example, digital video recorders offered by Replay Networks (in combination with Replay TV service) and Philips (in combination with TiVo service) include a hard disk drive with a storage capacity of between 10 GB and 30 GB that allow recording of up to 30 hours of television programming. These digital video recorders, also referred to as personal video recorders, and the respective services allow the viewer to personalize television viewing. For instance, personal video recorders can learn a viewer's programs and automatically record programs it expects a viewer to like. The viewer can also, among other activities, watch and pause live TV. That is, the viewer can operate a remote control to pause a favorite show when someone calls and pick up the show again exactly where the viewer left off.

Personalized television, like conventional television, is reliant upon commercials. Advertisers try to place their commercials so that a well-defined target group, which is likely to watch certain types of programs, may see the commercials. Personalized television, however, may defeat the advertisers' objectives.

There is therefore a need to improve upon the prior art technique for displaying streaming video data so that it is more likely that an interested viewer in fact watches alternative subject matter data, e.g., a commercial or content-related information, during a program of a preferred content, e.g., a movie. For instance, while the viewer watches a sport program, the content-related information may include details of the players and their scoring history.

SUMMARY OF THE INVENTION

The present invention may be regarded as a method of permitting viewing of alternative subject matter data on a display while receiving streaming video data without loss of the streaming video data. The method receives streaming video data and displays the streaming video data as a program of a first content. Upon selection by a viewer of the alternative subject matter data, the method stores the streaming video data on a personal video recorder. When the viewer selects returning to viewing of the streaming video data on the display, the method displays the streaming video data stored on the personal video recorder on the display and continues to store incoming streaming video data on the personal video recorder.

The present invention may also be regarded as a method of operating a personal video recorder wherein the personal video recorder is configured to receive streaming video data and to output the streaming video data to a display. While the method receives and displays streaming video data, the method displays an alternative display choice. The method receives an input to choose the alternative display and, in response to the input, the method automatically initiates recording the streaming video data on the personal video recorder. The method terminates displaying the streaming video data and initiates displaying the alternative display.

The present invention may further be regarded as a personal video recorder that permits a viewer to watch alternative subject matter data while receiving streaming video data without loss of the streaming video data. The personal video recorder includes a stream controller receiving compressed streaming video data including a program of a first content, a storage device coupled to the stream controller to selectively store the compressed streaming video data, and a microprocessor coupled to the stream controller. The microprocessor is configured to detect a selection by a viewer of the alternative subject matter data, to control the stream controller to store the streaming video data on the storage device while the personal video recorder causes displaying of the alternative subject matter data on the display, and upon the viewer selecting to return to viewing of the program of the first content, to read the streaming video data stored on the storage device so that the personal video recorder causes displaying the program of the first content, and to continue storing the incoming streaming video data on the storage device. This system allows a user to use one click of a command device to select alternative subject matter data and to save streaming video data as primary content so that upon a subsequent command the viewer can resume watching the original content where it was left.

The present invention may also be regarded as a method of permitting viewing of alternative subject matter data on a display while receiving streaming video data without loss of the streaming video data. The method receives streaming video data and stores the streaming video data on a personal video recorder. The method further displays the streaming video data as a program of a first content on a display. Upon selection by a viewer of the alternative subject matter data, the method marks the storing of the streaming video data to indicate the selection of the alternative subject matter data, and displays the alternative subject matter data on the display. When the viewer selects returning to viewing of the program of the first content on the display, the method displays the streaming video data stored on the personal video recorder subsequent to the marking and continues to store the incoming video stream on the personal video recorder. Preferably the marking represents a point in time where the first content was left.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
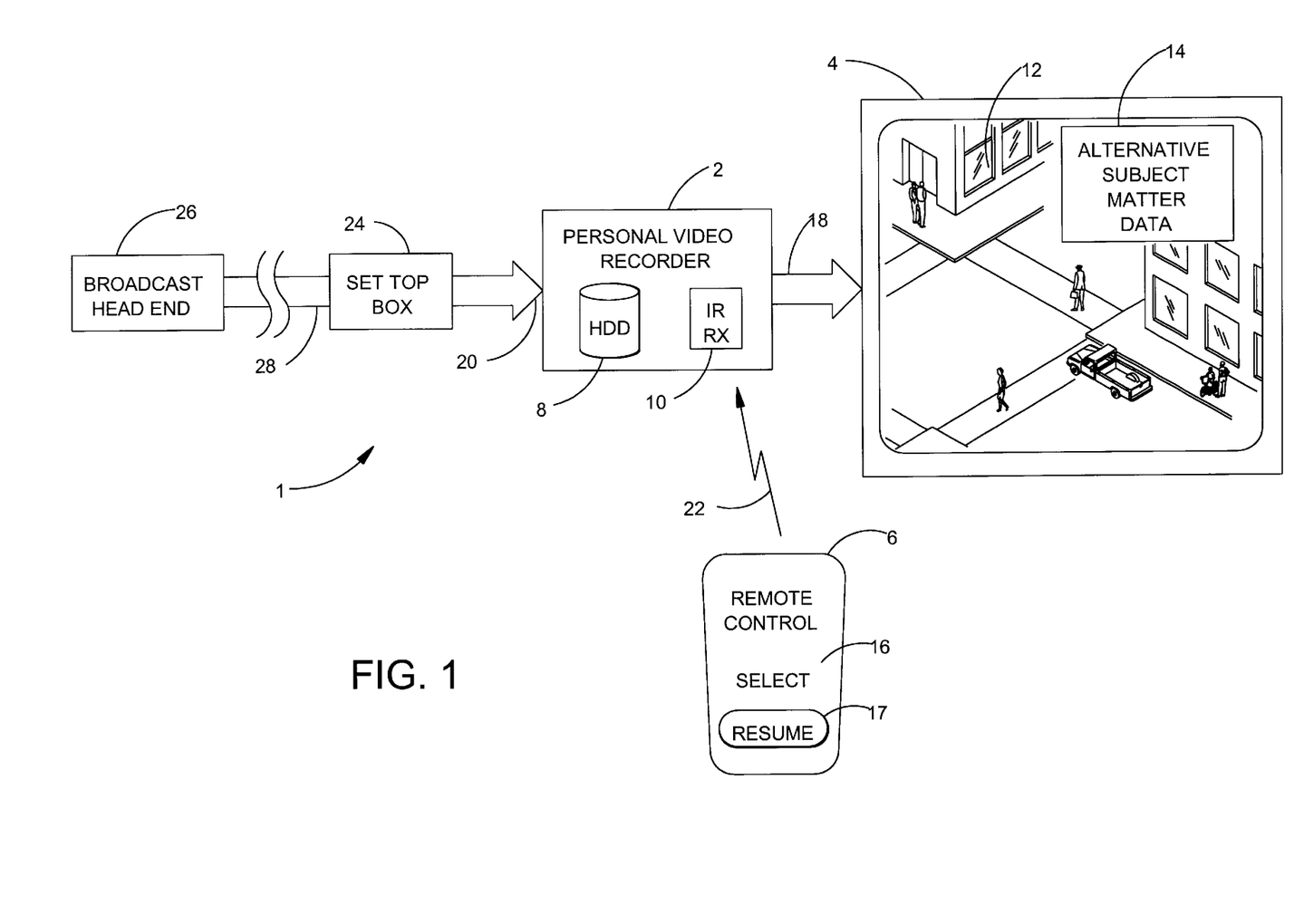
FIG. 1 shows a system for displaying streaming video data in accordance with an embodiment of the present invention that includes a personal video recorder connected to a display for displaying streaming video data and alternative subject matter data, wherein the personal video recorder automatically records the streaming video data upon selection by a viewer of the alternative subject matter data.

FIG. 1 shows an embodiment of a system 1 for displaying streaming video data in accordance with an embodiment of the present invention, which is configured to operate in accordance with a method of the present invention. The system 1 includes a personal video recorder 2 connected through a data line 18 to a display 4, a set top box 24 connected to a port 20 of the personal video recorder 2, a broadcast head end 26 connected through a cable 28 to the personal video recorder 2, and a remote control 6. The following description focuses initially on a description of the method in accordance with one embodiment of the present invention. Further details of the system 1 are described below.

Figure 2:
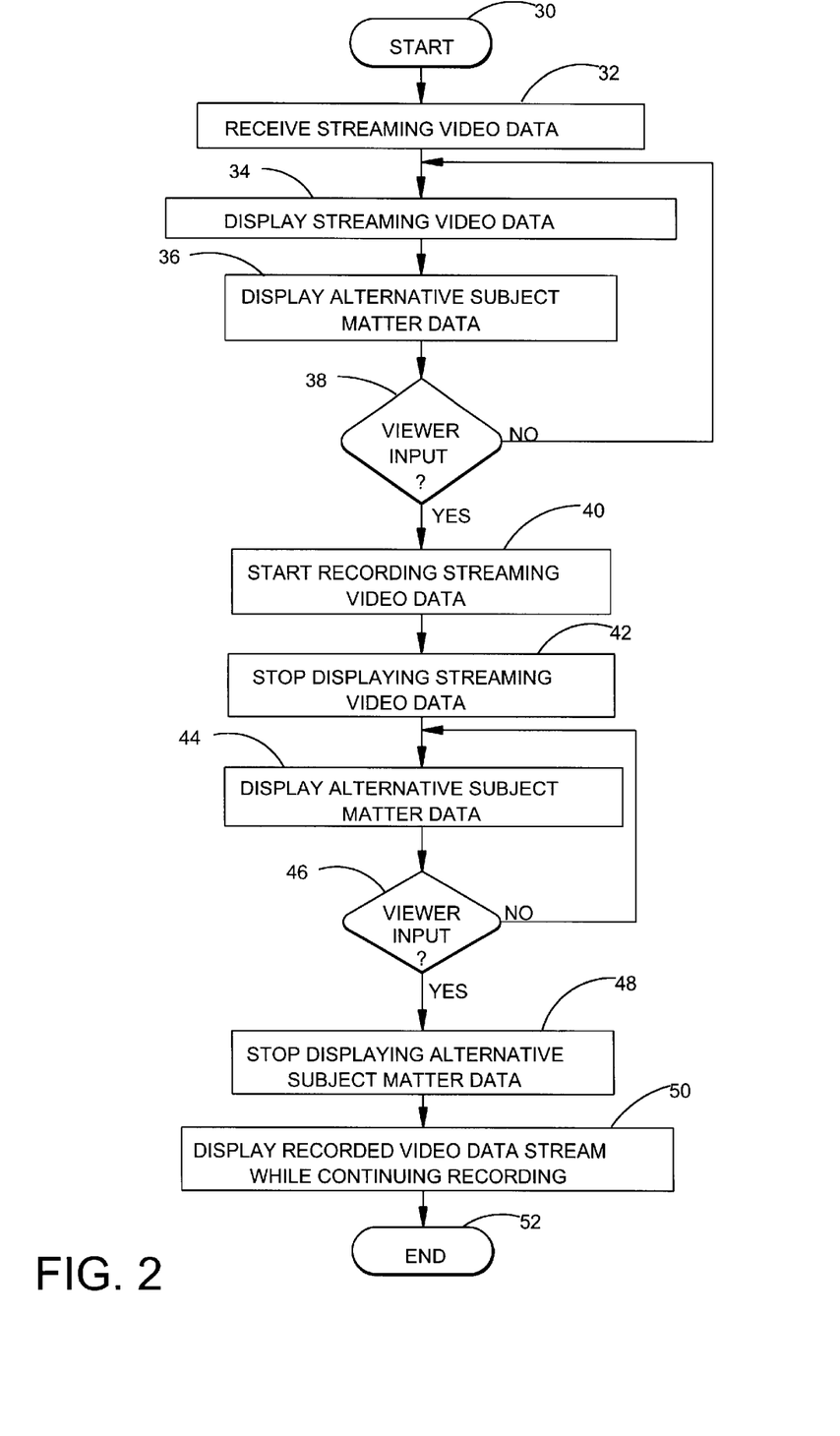
FIG. 2 is a flow chart in accordance with an embodiment of the present invention that displays streaming video data and alternative subject matter data on a display and that automatically records the streaming video data upon selection by a viewer of the alternative subject matter data.

FIG. 2 is a flow chart of a procedure illustrating the method in accordance with the present invention that permits a viewer to view alternative subject matter data 14, e.g., an advertisement, on the display 4 while receiving streaming video data without loss of the streaming video data. The personal video recorder 2 receives streaming video data and the display 4 displays the streaming video data as a program of a first content 12. Upon selection by a viewer of the alternative subject matter data 14, the personal video recorder 2 stores the streaming video data. When the viewer selects returning to viewing of the streaming video data on the display 4, the display 4 displays the streaming video data stored on the personal video recorder 2, while the personal video recorder 2 continues to store incoming streaming video data.

In a step 30, e.g., when the viewer turns the display 4 and the personal video recorder 2 on, the procedure initializes the system 1. The initialization procedure includes determining whether the personal video recorder 2 is operating and is properly connected to receive streaming video data, and also determining how much storage capacity is available on the personal video recorder 2.

In step 32, the viewer selects a channel for watching a desired program as live TV, such as a movie or a show. The personal video recorder 2 receives streaming video data from the set top box 24 and passes it through to the display 4. The display 4 displays the streaming video data as the first content 12, as represented in a step 34.

In step 36, the system 1 is configured to display at least one alternative subject matter data 14 while the viewer continues watching the first content 12. The alternative subject matter data 14 may be displayed, for example, as a picture-in-picture miniature window, as an icon, or as a banner with a message, for example, a commercial for a product or service, to entice the viewer. In case the viewer wants to learn more about the product or service, the viewer may select the alternative subject matter data 14 by pressing a select button 16 on the remote control 6, and begin exploring the alternative subject matter data 14.

In step 38, the system 1 determines whether the viewer inputs a selection to watch the alternative subject matter data 14. If the viewer prefers watching the first content 12 instead of the alternative subject matter data 14, i.e., no viewer input, the procedure returns along the NO branch to the step 34 and continues displaying the first content 12. However, when the viewer presses the select button 16, the personal video recorder 2 detects a corresponding control signal. Further, if the personal video recorder 2 recognizes the control signal as a command for displaying the alternative subject matter data 14, the procedure proceeds along the YES branch to a step 40.

In the step 40, the system 1 starts recording the program of the first content 12. The personal video recorder 2 automatically begins recording, i.e., storing the program of the first content 12 on the personal video recorder 2. Therefore, as soon as the viewer selects the alternative subject matter data 14, the personal video recorder 2 automatically records the program of the first content 12 without requiring the viewer to press an additional "record" button on the remote control 6. The personal video recorder 2, thus, has a "one-click" function that triggers the automatic recording of the first content 12.

In step 42 and then in a step 44, when the viewer presses the select button 16, the system 1 stops displaying the program of the first content 12, and starts displaying the alternative subject matter data 14. The alternative subject matter data 14 may be configured to have various levels that allow the viewer to explore the alternative subject matter data 14 level-by-level, wherein each lower level may provide more details about the product or service.

In step 46, the system 1 displays the alternative subject matter data 14 until the viewer inputs a selection to watch again the program of the first content 12. The viewer can explore the enticing message only briefly or for a longer period of time. That is, absent a viewer input, the procedure returns along the NO branch to the step 44 and continues to display the alternative subject matter data 14. However, when the viewer is finished, the viewer simply clicks on a resume button 17 or an equivalent function key sequence on the remote control 6 and resumes viewing the first content 12 where it was left off. In this case, the procedure proceeds along the YES branch to a step 48. In the step 48, the system 1 stops displaying the alternative subject matter data 14.

In step 50, the system 1 starts displaying again the program of the first content 12. The program of the first content 12 now being displayed has been recorded since the moment the viewer selected watching the alternative subject matter data 14. Thus, the viewer continues watching the program of the first content 12 precisely where it was left off. However, because the personal video recorder 2 still receives the program of the first content 12 as live TV, the personal video recorder 2 continues recording the program of the first content 12. The procedure ends at a step 52.

It is contemplated that the viewer may catch up (by skipping forward) with the incoming streaming video data and, after some time, in fact watch again live TV. The program of the first content 12 may include short breaks for commercials. Thus, when the viewer watches the recorded program of the first content 12, the viewer may skip the commercials and catch up with the live TV. In one embodiment, for instance, by calculating the duration of the skipped commercials, by other means, the personal video recorder 2 determines when a recording point of the live TV coincides with a watching point of the recorded program of the first content 12. The personal video recorder 2 advantageously stops recording when the recording point and the watching points coincide.

In another embodiment, the personal video recorder 2 may operate in a mode that permits continuous recording of "new" first content 12 and overwriting of "old" first content 12. For instance, in this mode the storage device 8 may have a storage capacity of one hour. As soon as one hour of the first content 12 has been recorded, the "new" first content 12 begins overwriting the "old" first content 12 so that the viewer could watch always the last hour of the first content 12. The storage device 8 operates in a manner similar to the operation of a circular buffer, wherein the content that is stored first is overwritten when, for example, the one-hour buffer is full.

In use, the personal video recorder 2 may already be recording the first content 12 when the viewer selects watching the alternative subject matter data 14. This situation may occur when the personal video recorder 2 operates in the record-overwrite mode described above, or when the viewer programmed the personal video recorder 2 to record, e.g., a movie. In these situations, when the viewer selects watching the alternative subject matter data 14, the personal video recorder 2 automatically marks ("bookmarks") the recording of the first content 12 so that the recorded first content 12 is associated with a bookmark indicating where the viewer left to watch the alternative subject matter data 14. The bookmark allows the viewer to resume watching the first content 12 where it was left. In this mode of operation, the personal video recorder 2 does not stop recording when the viewer resumes watching the first content 12.

It is contemplated that the personal video recorder 2 may be configured to set a bookmark even if the viewer does not intend to record a whole movie or if the personal video recorder 2 does not operate in the record-overwrite mode. The bookmark generally allows easy identification of the location where the viewer selected watching the alternative subject matter data 14.

Further details of the system 1 are shown in FIG. 1. As discussed above, the viewer controls the personal video recorder 2 through the remote control 6. As illustrated in FIG. 1 by way of example, the remote control 6 communicates with the personal video recorder 2 via a wireless link 22 that conveys control signals using infrared (IR) light. Remote controls and their various functions are generally known in the art. In particular, it is known that IR light is modulated with a specific command, e.g., channel up or down, volume up or down, and the like, and that the controlled device detects and processes the modulated IR light to execute the command in the controlled device. The personal video recorder 2 has an IR receiver 10 that receives the control signals transmitted by the remote control 6.

In an alternative embodiment, the viewer may use the remote control 6 to control the set top box 24 instead of the personal video recorder 2. The set top box 24 then sends a control signal to the personal video recorder 2 indicating that a viewer command has been received by the set top box 24. The viewer command triggers recording of the first content 12 or bookmarking the first content 12. The communication between the set top box 24 and the personal video recorder 2 may occur via a communications bus, e.g., a universal serial bus (USB), and appropriate interface circuits.

The cable 28 that connects the set top box 24 to the broadcast head end 26 may be part of a cable TV distribution network that serves a plurality of households. Further, it is contemplated that the cable 28 may connect the set top box 24 to an antenna or a satellite dish. Hereinafter, the set top box 24 is described as being connected to the broadcast head end 26.

The broadcast head end 26 provides streaming video data that includes a multitude of channels with a multitude of programs and audio and video data. The broadcast head end 26 may further enable the viewer to subscribe to and receive video-on-demand or pay-per-view services. The format of the streaming video data may be in accordance with known video/television formats such as NTSC, PAL, S-Video or the like.

The set top box 24 includes at least one tuner that selects one of the channels of the streaming video data provided by the broadcast head end 26. Using the remote control 6 or a separate remote control for the set top box 24, the viewer can control the set top box 24 to tune to the selected channel. It is contemplated that in an alternative embodiment, the set top box 24 and the personal video recorder 2 may be combined in a single unit. Thus, the personal video recorder 2 may receive streaming video data that includes a multitude of channels and may internally tune to a selected channel. Alternatively, the personal video recorder 2 may receive only one channel selected from the multitude of channels by the external set top box 24.

The streaming video data transmitted by the broadcast head end 26 includes the alternative subject matter data 14. The alternative subject matter data 14 may be transmitted within a channel and may be associated with the program of the channel. Alternatively, the alternative subject matter data 14 may be transmitted in a dedicated channel that is unrelated to the other channels and their programs. In another embodiment, the alternative subject matter data 14 may be transmitted via a modem connection. The alternative subject matter data 14 may be transmitted prior to receiving the streaming video data. For instance, the alternative subject matter data 14 may be transmitted during night time, e.g., when the display 4 is inactive and the viewer is asleep, and pre-recorded on the personal video recorder 2 like any other stream of video data prior to its presentation, for example, in connection with a movie.

Once the alternative subject matter data 14 is pre-recorded, it is available to be displayed on the display 4 when the viewer makes a selection. As discussed above, a banner or an icon representing the alternative subject matter data 14 is displayed while the viewer watches a program as live TV. When the viewer "selects" the banner or icon, i.e., selects to watch the alternative subject matter data 14, the personal video recorder 2 retrieves the pre-recorded alternative subject matter data 14 to be displayed, and automatically records the program the viewer was watching prior to the selection.

The personal video recorder 2 includes a storage device, such as a hard disk drive (HDD) 8. The hard disk drive 8, for example, has a storage capacity of between 10 GB and 30

GB to selectively store and, thus, record digital information such as sequences of the streaming video data and the alternative subject matter data 14 received at the port 20. That is, the hard disk drive 8 may store up to 30 hours of compressed video and audio data. The compression is often achieved by using a standardized process defined by the Moving Picture Expert Group (MPEG), e.g., MPEG-2. The recorded streaming video data and the alternative subject matter data are then available for later reproduction.

It is contemplated that in one embodiment, the personal video recorder 2 may be configured to perform MPEG-2 compression and decompression and to selectively store the MPEG-2 compressed video data. In another embodiment, the system 1 may be configured so that the personal video recorder 2 already receives MPEG-2 compressed video data. The personal video recorder 2, thus, selectively stores the MPEG-2 compressed video data without prior compression within the personal video recorder 2. The stored compressed video data may be decompressed outside the personal video recorder 2.

Figure 3:
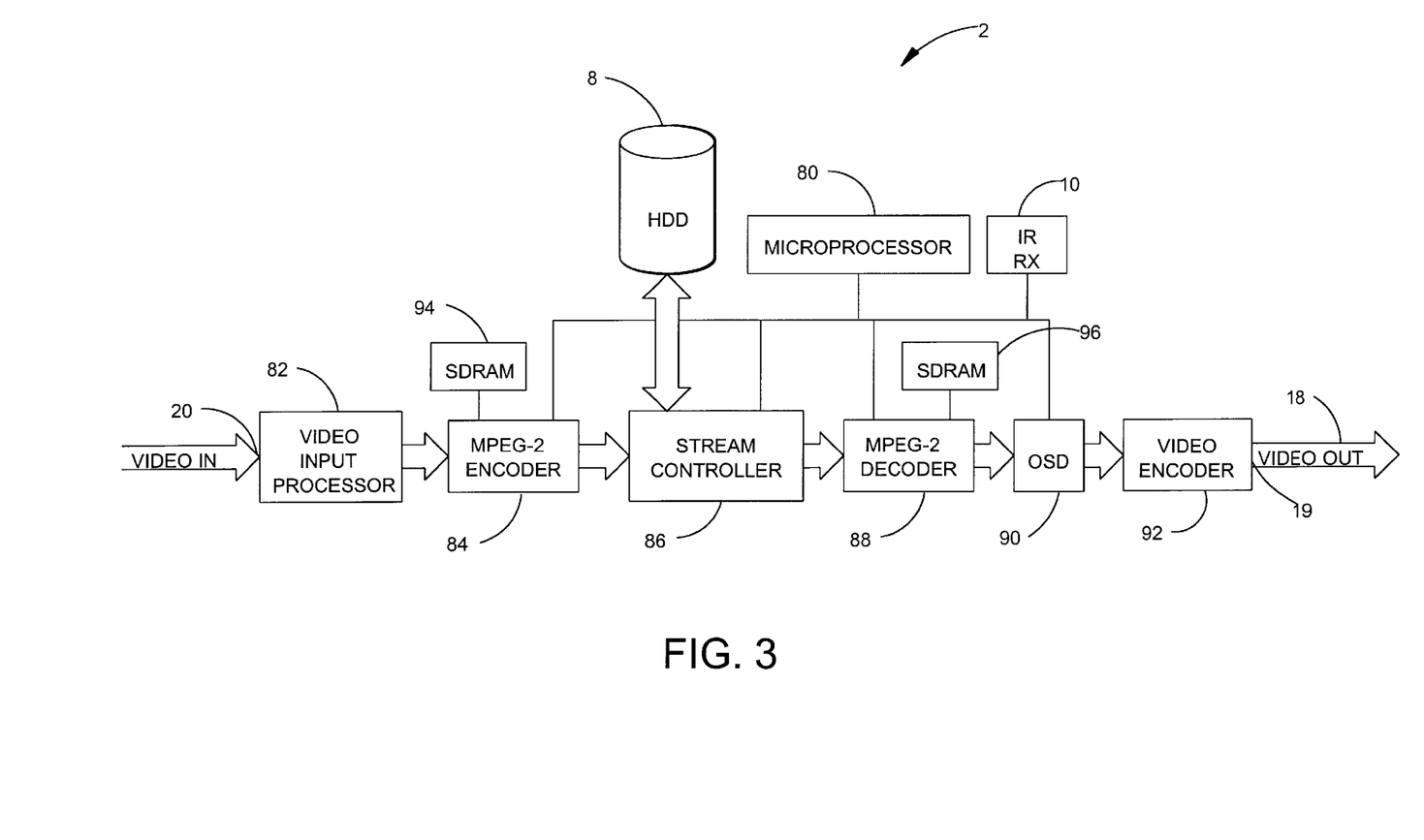
FIG. 3 schematically illustrates an exemplary embodiment of a personal video recorder included in the system of FIG. 1 that includes a hard disk drive for storing streaming video data and alternative subject matter data in accordance with the present invention.

FIG. 3 schematically illustrates an exemplary embodiment of a personal video recorder included in the system 1. The personal video recorder includes the hard disk drive 8 for storing streaming video data and alternative subject matter data 14 in accordance with the present invention. At the port 20, the personal video recorder 2 receives streaming video data, indicated as VIDEO IN, and at a port 19, the personal video recorder 2 outputs streaming video data, indicated as VIDEO OUT. Between the port 20 and the port 19, the personal video recorder 2 has a signal path for streaming video data. The path includes, as seen from the port 20, a video input processor 82, an MPEG-2 encoder 84, a stream controller 86, an MPEG-2 decoder 88, an on-screen graphics driver (OSD) 90 and a video encoder 92. The output of the video encoder 92 is connected to the port 19. As shown in FIG. 3, these components of the personal video recorder 2 are serially arranged along the signal path and are interconnected to convey streaming video data. The MPEG-2 encoder 84 and the MPEG-2 decoder 88 are each connected to a respective SDRAM memory 94, 96. In addition, a microprocessor 80 is connected to communicate with the on-screen graphics driver 90, the stream controller 86, the IR receiver 10, the MPEG-2 encoder 84 and the MPEG-2 decoder 88. The hard disk drive 8 is coupled to the stream controller 86.

The video input processor 82 receives streaming video data from the set top box 24. This streaming video data is in accordance to NTSC or PAL television standard. The MPEG-2 encoder 84 receives the streaming video data from the video input processor 82 and compresses (i.e., encodes) the streaming video data it in accordance with the MPEG-2 standard. The MPEG-2 encoder 84 outputs an MPEG single program transport stream that can be stored on the hard disk drive 8.

The stream controller 86 receives the MPEG single program transport stream from the MPEG-2 encoder 84. The stream controller 86 generally provides access to the hard disk drive 8 for storage and retrieval of MPEG content. For instance, it controls the pre-recording of the alternative subject matter data 14 and its storage in levels of varying detail. In response to a viewer selection, the stream controller 86 retrieves the requested level of detail of the alternative subject matter data 14.

The MPEG-2 decoder 88 performs the inverse function of the MPEG-2 encoder 84. The decompressed MPEG single program stream is input to the on-screen graphics engine 90. The engine 90 is configured to display a user interface to the television set 4. The video encoder 92 presents the output of the engine 90 to the television set 4 by formatting it in accordance with NTSC or PAL requirements.

The microprocessor 80 generally performs the function of controlling the personal video recorder 2. For example, the microprocessor 80 operates the personal video recorder 2 in accordance with commands received from the remote control 6. Further, the microprocessor 80 is configured to operate the personal video recorder 2 in accordance with the invention and to execute the procedure illustrated in FIG. 2. The procedure may be implemented in software, as an application specific integrated circuit, as firmware, or as a combination thereof.

It is contemplated that the personal video recorder 2 includes a real time clock for applications that require knowledge of the current date and time of day. For example, the viewer can program the personal video recorder 2 to record a program on a specific date and time. Further, the personal video recorder 2 assigns a time stamp to each recording. In an alternate embodiment, the real time clock information may be received from the set top box 24.

Figure 4:
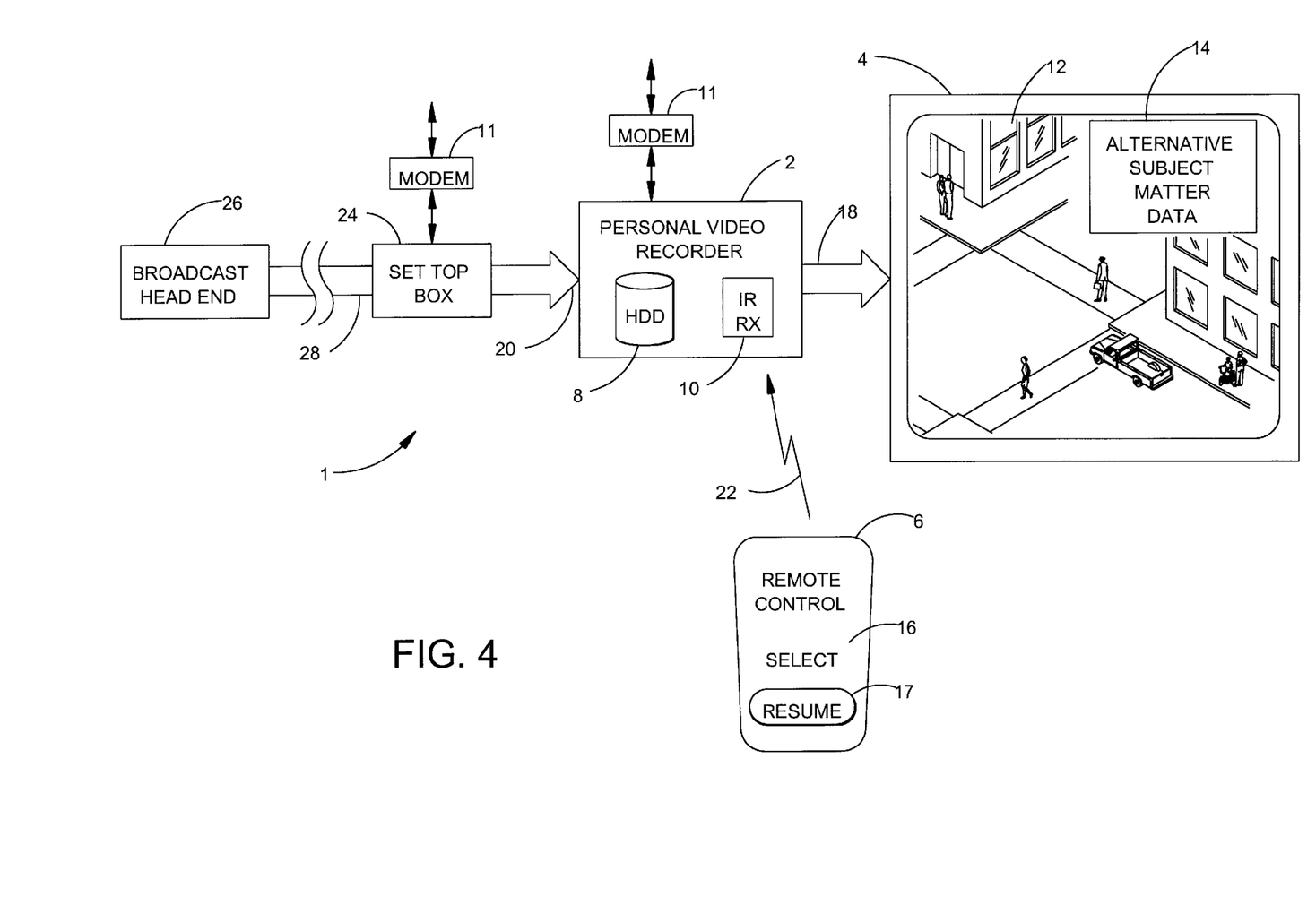
FIG. 4 shows an alternative embodiment of the system shown in FIG. 1 that includes a modem that may be connected to the personal video recorder or a set top box to receive the alternative subject matter data.

FIG. 4 shows an alternative embodiment of the system 1 shown in FIG. 1. The alternative embodiment of the system 1 has the same general structure as the system 1 and reference is made to the foregoing description of FIG. 1 for a detailed description of the system 1.

The system 1 shown in FIG. 4 includes a modem 11 that may be connected to the set top box 24 or to the personal video recorder 2. For illustrative purposes, this is illustrated through one modem 11 connected to the set top box 24 and one modem 11 connected to the personal video recorder 2. It is contemplated, however, that the system 1 includes only one modem 11, which may be an internal or external modem connected to a public telephone network (PSTN) or to a (coaxial) cable. In the latter case, the modem 11 is referred to as a cable modem.

The modem 11 may connect the system 1 to the Internet from which the system 1 may receive the alternative subject matter data 14. For instance, the system 1 may automatically access a predetermined web site at predetermined times and download the alternative subject matter data 14. The storage device 8 of the personal video recorder 2 may store this alternative subject matter data 14 for later display on the display 4.

What is claimed is:

1. A method of permitting viewing of alternative subject matter data on a display while receiving streaming video data without loss of the streaming video data, comprising:

storing alternative subject matter data on a personal video recorder prior to receiving streaming video data;

receiving streaming video data;

displaying the streaming video data as a program of a first content on a display;

upon selection by a viewer of the alternative subject matter data, storing the streaming video data on the personal video recorder and displaying the selected alternative subject matter data on the display; and upon the viewer selecting to return to viewing of the program of the first content, displaying the streaming video data stored on the personal video recorder and continuing to store the incoming streaming video data on the personal video recorder.

2. The method of claim 1, wherein upon the viewer selecting to return to viewing of the streaming video on the display, the storing of the incoming streaming video data continues until the viewing point and the recording point coincide.

3. The method of claim 1, wherein the streaming video data is associated with advertising data, and wherein the alternative subject matter data is such advertising data.

4. The method of claim 1, wherein the streaming video data is associated with information related to the first content, and wherein the alternative subject matter data is such information.

5. The method of claim 1, further comprising storing the alternative subject matter in levels of varying detail.

6. The method of claim 1, further comprising receiving the alternative subject matter data when the display is inactive and pre-recording it on the personal video recorder.

7. The method of claim 1, further comprising displaying the selected alternative subject matter data as a banner while displaying the streaming video data.

8. The method of claim 7, further comprising retrieving the alternative subject matter data from the personal video recorder upon the viewer selecting the alternative subject matter displayed as the banner.

9. The method of claim 1, further comprising displaying the selected alternative subject matter data as an icon while displaying the streaming video data.

10. The method of claim 1, further comprising receiving the alternative subject matter data in a broadcast channel separate from a broadcast channel transmitting the first content.

11. The method of claim 1, further comprising receiving the alternative subject matter data via a modem connection.

12. The method of claim 1, further comprising receiving the alternative subject matter data from a storage device of the personal video recorder.

13. The method of claim 1, wherein:
storing the streaming video data on the personal video recorder is occurring before the viewer selects the alternative subject matter data;
the personal video recorder responds to the viewer selecting the alternative subject matter data by marking a location in the streaming video data; and
the personal video recorder responds to the viewer selecting to return to viewing of the program of the first content by resuming displaying the stored streaming video data beginning at the marked location while continuing to store the streaming video data.

14. The method of claim 1, wherein:
the streaming video data is not stored until the viewer selects the alternative subject matter data;
the personal video recorder responds to the viewer selecting the alternative subject matter data by beginning to record the streaming video data at a first location in the video streaming data; and
the personal video recorder responds to the viewer selecting to return to viewing of the program of the first content by displaying the stored streaming video data beginning at the first location in the streaming video data while continuing to store the streaming video data.

15. The method of claim 1, wherein a representation of the alternative subject matter is displayed as a picture that can be selected by a viewer to cause the personal video recorder to begin displaying the alternative subject while recording the streaming video data.

16. A method of operating a person video recorder configured to receive streaming video data and to output streaming video data to a display, the method comprising:

storing alternative subject matter data on the personal video recorder prior to receiving streaming video data;
displaying an indication of the availability of the alternative subject matter data while receiving and displaying the streaming video data; and
receiving an input to choose the alternative subject matter data, and in response to the input:
automatically initiating a recording of the streaming video data on the personal video recorder;
terminating display of the streaming video data; and
displaying the alternative subject matter data.

17. The method of claim 16, further comprising displaying the streaming video data stored on the personal video recorder and continuing to store the incoming streaming video data on the personal video recorder upon an input to return to viewing the streaming video.

18. The method of claim 16, further comprising storing the alternative subject matter in levels of varying detail.

19. The method of claim 16, further comprising displaying the alternative subject matter data as at least one of a banner, or icon or miniature picture window while displaying the streaming video data.

20. The method of claim 19, further comprising retrieving the alternative subject matter data from the personal video recorder upon the viewer selecting the alternative subject matter displayed as at least one of the banner and the icon.

21. A personal video recorder permitting a viewer to watch alternative subject matter data while receiving streaming video data without loss of the streaming video data, comprising:
a stream controller receiving compressed streaming video data including a program of a first content;
a storage device coupled to the stream controller to selectively store compressed streaming video data; and
a microprocessor coupled to the stream controller, the microprocessor being configured to cause alternative subject matter data to be stored prior to receiving the streaming video data, to detect a selection by a viewer of alternative subject matter data, to control the stream controller to store streaming video data on the storage device while the personal video recorder causes displaying of the alternative subject matter data on a display, and upon the viewer selecting to return to viewing of the program of the first content, to retrieve the streaming video data from the storage device so that the personal video recorder causes displaying of the program of the first content, and to continue storing the incoming streaming video data on the storage device.

22. A method of permitting viewing of alternative subject matter data on a display while receiving streaming video data without loss of the streaming video data, comprising:
storing alternative subject matter data on a personal video recorder prior to receiving streaming video data;
receiving streaming video data;
storing the streaming video data on a personal video recorder;
displaying the streaming video data as a program of a first content on a display;
upon selection by a viewer of the alternative subject matter data, marking the storing of the streaming video data to indicate the selection of the alternative subject matter data, and displaying the alternative subject matter data on the display; and
upon the viewer selecting to return to viewing of the program of the first content, displaying the streaming video data stored on the personal video recorder subsequent to said marking and continuing to store the incoming streaming video data on the personal video recorder.

23. The method of claim 22, further comprising programming the personal video recorder to store the program of the first content having a predetermined duration, wherein the marking indicates where the viewer selected the alternative subject matter data within the predetermined duration, and wherein the marking indicates where to resume viewing the first content.

24. The method of claim 22, wherein storing the streaming video data includes continuously storing the streaming video data on a storage device having a set capacity to store a predetermined duration of the streaming video data, and wherein the storage device overwrites previously stored streaming video media data upon exceeding said predetermined duration.

25. A method of permitting viewing of alternative subject matter data on a display while receiving streaming video data without loss of the streaming video data, comprising:

receiving streaming video data;

displaying the streaming video data as a program of a first content on a display;

upon selection by a viewer of the alternative subject matter data, storing the streaming video data on a personal video recorder and displaying the alternative subject matter data on the display; and upon the viewer selecting to return to viewing of the program of the first content, displaying the streaming video data stored on the personal video recorder and continuing to store the incoming streaming video data on the person video recorder, wherein the storing of the incoming streaming video data continues until the viewing point and the recording point coincide.

\* \* \* \* \*